(12) United States Patent
Mari et al.

(10) Patent No.: US 11,144,898 B2
(45) Date of Patent: *Oct. 12, 2021

(54) SYSTEM AND METHOD FOR GENERATING COHORTS

(71) Applicant: The Toronto-Dominion Bank, Toronto (CA)

(72) Inventors: Kevin Ricardo Mari, Scarborough (CA); Evan Zachary Cohen, Mississauga (CA); Jonathan K. Barnett, Oakville (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,937

(22) Filed: Apr. 14, 2020

(65) Prior Publication Data

US 2020/0242578 A1 Jul. 30, 2020

Related U.S. Application Data

(63) Continuation of application No. 15/288,266, filed on Oct. 7, 2016, now Pat. No. 10,657,509.

(60) Provisional application No. 62/249,138, filed on Oct. 30, 2015.

(51) Int. Cl.
*G06Q 20/20* (2012.01)
*G06F 16/23* (2019.01)
*G06F 16/21* (2019.01)
*G06Q 10/00* (2012.01)

(52) U.S. Cl.
CPC ............. *G06Q 20/20* (2013.01); *G06F 16/21* (2019.01); *G06F 16/23* (2019.01)

(58) Field of Classification Search
CPC .......... G06Q 20/20; G06F 16/21; G06F 16/23
USPC .......................................................... 705/16
See application file for complete search history.

(56) References Cited

U.S. PATENT DOCUMENTS

2013/0007760 A1* 1/2013 O'Sullivan ............ G06Q 10/00 718/104
2017/0091823 A1* 3/2017 Adinarayan ....... G06Q 30/0267

* cited by examiner

*Primary Examiner* — Garcia Ade
(74) *Attorney, Agent, or Firm* — Graham Patent Law (57) ABSTRACT

An event monitoring processor includes a processor and at least one memory. The memory stores a database of cohort definitions. Each cohort definition defines a respective cohort. The processor is configured to receive particulars of a member event initiated by a member of one of the cohorts, generate an additional cohort definition from the particulars of the member event, and save the additional cohort definition in the cohort definitions database. The processor is also configured to receive member data associated with the cohort member, select one of the cohorts in the cohort definitions database from a correlation between the member data and the cohort definitions, and save in a cohort member database a member record that identifies a correlation between the member event and an event defined in the selected one cohort.

20 Claims, 4 Drawing Sheets

SYSTEM AND METHOD FOR GENERATING COHORTS

RELATED APPLICATIONS

This patent application is a continuation of U.S. patent application Ser. No. 15/288,266, filed Oct. 7, 2016, and claims the benefit of the filing date of U.S. Patent Application Ser. No. 62/249,138, filed Oct. 30, 2015, the contents of both of which are incorporated herein by reference.

FIELD OF THE INVENTION

This patent application relates to a method and system for monitoring event activity.

BACKGROUND

Workman (US 2007/0080213) describes automatically rounding up to the nearest whole-dollar amount a purchase made by a customer through a point-of-sale terminal and the customer's debit or credit card. The difference between the original purchase price and the whole-dollar amount, and any additional amount specified by the customer, is automatically transferred to a designated account that is preferably distinct from the customer's chequing and savings accounts.

SUMMARY

This patent application discloses an event monitoring processor and associated method that generates cohorts based on events of cohort members and events typical of the cohorts.

In accordance with the disclosure, there is provided an event monitoring processor that includes a notification processor and a database of cohort definitions. Each cohort definition defines a respective cohort. The notification processor is configured to receive an action notification identifying a member action that is initiated by a member of one of the cohorts.

The notification processor is configured to determine, from the cohort definition of the one cohort, a correlation outcome value from a correlation between the member action and an action associated with the one cohort, and to update at least one of the cohort definitions with particulars of the member action. The notification processor is also configured to add to a cohort member database a member database record that identifies the correlation outcome value. The cohort member database is associated with the cohort member.

In accordance with the disclosure, there is provided a method of monitoring cohort activity that involves maintaining a database of cohort definitions. Each cohort definition defines a respective cohort. The method involves receiving an action notification identifying a member action that is initiated by a member of one of the cohorts.

The method involves determining, from the cohort definition of the one cohort, a correlation outcome value from a correlation between the member action and an action associated with the one cohort, and updating at least one of the cohort definitions with particulars of the member action. The method also involves adding to a cohort member database a member database record that identifies the correlation outcome value. The cohort member database is associated with the cohort member.

The notification processor may be configured to determine a location of the cohort member from location information, and to determine the one cohort by correlating the location with the cohort definitions in substantially real-time with receiving the location information.

The notification processor may be configured to update the at least one cohort definition with the location of the cohort member. The notification processor may be configured to update the at least one cohort definition with a time instant of the member action.

The member action notification may include a pointer to a primary database, the member action may be a financial transaction, and the notification processor may be configured to effect a transfer of funds between the cohort member database and the primary database in an amount of the correlation outcome value. The notification processor may also be configured to transfer the amount of the correlation outcome value into a holding account from one of the cohort member database and the primary database, and to transfer a total balance from the holding account into another of the cohort member database and the primary database upon the total balance in the holding account exceeding a minimum threshold amount.

Since the cohort definitions can be updated with particulars of the cohort member action(s), and the cohort member database is updated based on a correlation between the cohort member action(s) and the action(s) typically associated with the member's cohort, the cohort definitions database improves the monitoring precision of the event monitoring processor.

BRIEF DESCRIPTION OF THE DRAWINGS

An exemplary event monitoring processor and method of monitoring cohort activity will now be described, with reference to the accompanying drawings, in which.

DETAILED DESCRIPTION

Event Monitoring System

Figure 1:
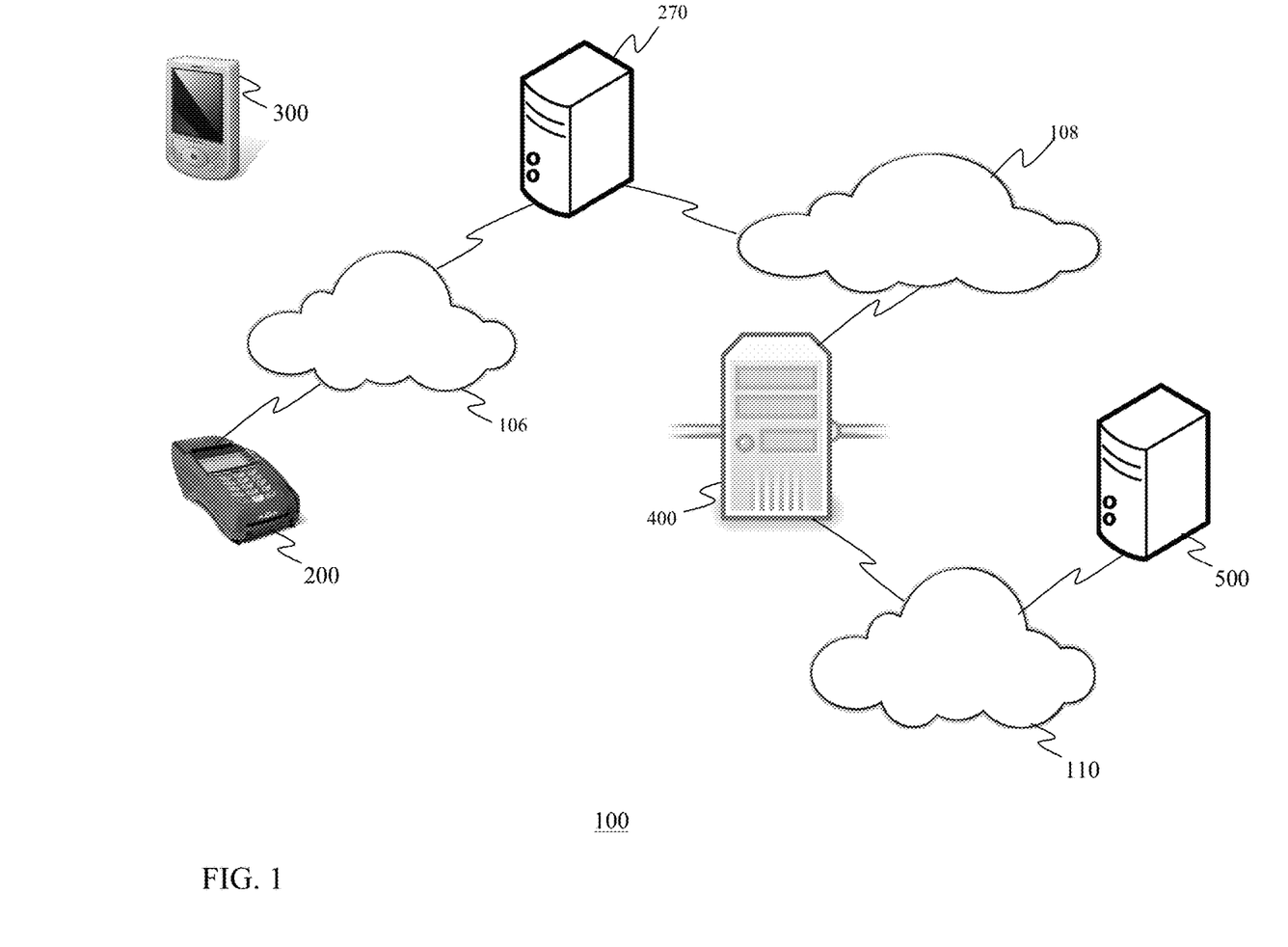
FIG. 1 is a schematic view of an event monitoring system, depicting a point-of-sale terminal, a mobile communications device, a financial institution server, and an event monitoring processor.

FIG. 1 is a schematic view of an event monitoring system, denoted generally as 100. As shown, the event monitoring system 100 comprises a point-of-sale (POS) terminal 200, an acquirer server 270, a mobile communications device 300, a financial institution server 400, and an event monitoring processor 500. Although the payment processing system 100 is shown comprising only a single POS terminal 200, a single acquirer server 270, a single mobile communications device 300, and a single financial institution server 400, the payment processing system 100 typically includes a plurality of the POS terminals 200, acquirer servers 270, mobile communications devices 300, and financial institution servers 400.

Typically, the POS terminals 200 are deployed at a respective merchant's business premises, and are configured to communicate with one of the acquirer servers 270 via a secure acquirer network 106. Alternately, the POS terminals 200 may be deployed remotely from the merchant's business premises, and configured to communicate with an online merchant server (not shown) via a wide area network (e.g. the Internet).

The merchant may maintain a merchant price database that associates product codes with the current price information. As will be explained, each product offered for sale by the merchant is assigned a unique product code, and the POS terminals 200 may be configured to indirectly determine the current price of each product being purchased in a financial transaction by reading the product code of each product and querying the merchant price database for the current price information of the product. Alternately, the price information may be encoded in the product code, and the POS terminals 200 may be configured to directly determine the current price of the product by extracting the price information from the product code. Exemplary product codes include, but are not limited to, universal product codes (UPC), stock keeping units (SKU) and merchant category codes (MCC).

Each acquirer server 270 is associated with a financial institution of one or more merchants, and is configured to communicate with the POS terminals 200 via the acquirer network 106. The acquirer server 270 is also configured to communicate with the financial institution servers 400 via a payment network 108, such as VisaNet®, the Mastercard® Network or the Interac® Network, that is distinct from the acquirer network 106.

The mobile communications device 300 is configured to communicate with the event monitoring processor 500 via a mobile communications network (not shown). As non-limiting examples, one or more of the mobile communications device 300 could be implemented as a wireless-enabled tablet computer, a wireless-enabled PDA, or a smart phone. The mobile communications network may comprise a WiFi network, a cellular network, or a combination thereof.

Each financial institution server 400 is associated with and administered by a respective financial institution. Each financial institution server 400 maintains financial accounts for each of its customers, and is configured to communicate with the event monitoring processor 500 via a wide area network 110, such as the Internet.

The event monitoring processor 500 maintains or is in communication with a database of cohort definitions, each defining a respective cohort (i.e. a group of persons and/or objects having one or more common defining characteristics). As will be discussed in detail below, the event monitoring processor 500 receives an action notification that identifies a member action initiated by a member of one of the cohorts.

From the cohort definition of the one cohort, the event monitoring processor 500 determines a correlation outcome value from a correlation between the member action and an action that is associated with the one cohort. The event monitoring processor 500 also updates at least one of the cohort definitions with particulars of the member action. The event monitoring processor 500 then adds to a cohort member database a member database record that identifies the correlation outcome value. The cohort member database is associated with the cohort member.

Although the financial institution server 400 and the event monitoring processor 500 are shown in FIG. 1 as being separate entities, the functionality of the event monitoring processor 500 may be incorporated into one or more of the financial institution servers 400.

POS Terminal

The POS terminal 200 includes an input device, a display device, and a computer processing unit that is coupled to the input device and the display device. The input device may be implemented as a keyboard, touchpad, touchscreen or other input device suitable for allowing a user of the POS terminal 200 to input data and/or commands that may be required to complete the financial transaction. The display device may be implemented as a liquid crystal display (LCD) panel, cathode ray tube (CRT) display, plasma display panel, or other display device suitable for displaying transaction information to the user.

The POS terminal 200 may include a payment card interface that is coupled to the computer processing unit and configured to communicate with a payment card (e.g. credit card, debit card, loyalty card). The payment card is configured with a unique primary account number, and optionally also an expiry date and a personal identification number (PIN). As will be discussed, a financial institution issues (or authorizes a third party to issue) the payment card to a customer of the financial institution (cardholder), and maintains a financial account that is uniquely associated with the payment card.

The payment card may be implemented as a plastic card that has a contact form factor and/or a contactless (e.g. ISO 14443 based) form factor. If the payment card has a contact form factor, the payment card interface may comprise a physical port (e.g. smartcard reader) that allows the POS terminal 200 to communicate directly with the payment card. If the payment card has a contactless form factor, the payment card interface may comprise a wireless interface that allows the POS terminal 200 to communicate with the payment card via a wireless protocol, such as ISO 14443.

Alternately, the payment card may be implemented as software within a portable communications device, such as a smartphone, in which case the payment card interface may be configured to communicate with the payment card of the portable communications device using short-range communications protocols, such as Bluetooth and/or Near Field Communications (NFC) as examples.

As non-limiting examples, one or more of the POS terminals 200 may be implemented as a semi-integrated POS terminal that includes a "smart" pin-pad terminal in communication with an electronic cash register (ECR), or as a fully-integrated POS terminal that includes a "dumb" pin-pad terminal. Regardless of the implementation, the ECR is configured with a keypad, keyboard, bar code scanner or other input device that allows the product code that is printed on or otherwise associated with a product to be input into the ECR.

Mobile Device

Figure 2:
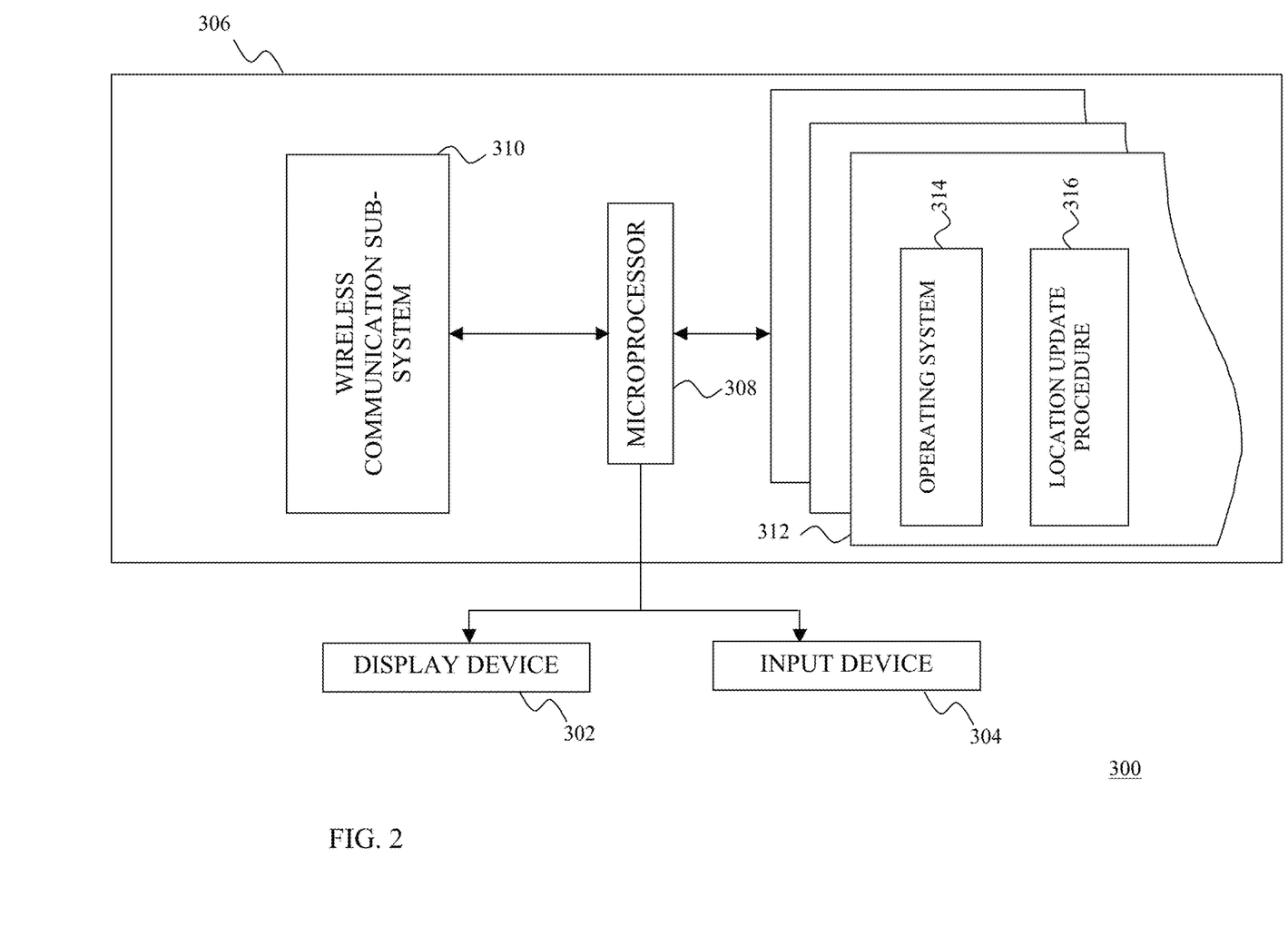
FIG. 2 is a schematic view of the mobile communications device.

A sample mobile communications device 300 is depicted in FIG. 2. As shown, the mobile communications device 300 includes a display 302, user input device 304, and a data processing system 306. The user input device 304 may be provided as a keyboard, biometric input device (e.g. microphone) and/or a touch-sensitive layer provided on the display 302. The data processing system 306 comprises a microprocessor 308, a wireless communication sub-system 310 and a computer-readable medium 312.

The communication sub-system 310 allows the mobile device 300 to communicate with the mobile communications network. As discussed, the mobile communications network may be configured as a WiFi network, a cellular network, or a combination thereof. Accordingly, the communication sub-system 310 allows the mobile device 300 to transmit and receive wireless communications signals over WiFi networks and/or cellular networks.

The computer-readable medium 312 typically comprises non-volatile non-transient electronic computer memory that stores computer processing instructions which, when accessed from the memory 312 and executed by the microprocessor 308, implement an operating system 314 and a location update procedure 316. The operating system 314 is configured to display output on the display 302, to receive user input from the input device 204, and to send and receive communication signals over the mobile communications network.

The operation of the location update procedure 316 will be discussed in greater detail below. However, it is sufficient at this point to note that the location update procedure 316 is configured to periodically transmit to the event monitoring processor 500, via the mobile communications network, a location update message that includes a member identifier that is uniquely associated with the user of the mobile communications device 300, and position data that is associated with the current location of the mobile communications device 300.

In one example, the position data comprises longitude/latitude co-ordinate data that identifies the current position of the mobile communications device 300, and the location update procedure 316 determines the current position of the mobile communications device 300, for example, from the WiFi network and/or cellular network of the mobile communications network and/or from a GPS receiver installed in the mobile communications device 300.

Financial Institution Server

Each financial institution server 400 is associated with and administered by a respective financial institution. The financial institution associated with the financial institution server 400 issues payment cards to cardholders (or authorizes a third party to issue the payment cards). Each financial institution server 400 is configured to communicate with the acquirer servers 270 via the payment network 108, and maintains a secure accounts database that includes groups of related database records each uniquely associated with a respective financial account. Each records group is also uniquely associated with one of the payment cards, and typically identifies the primary account number of the associated payment card, and credit/deposit entries to the associated financial account.

Event Monitoring Processor

Figure 3:
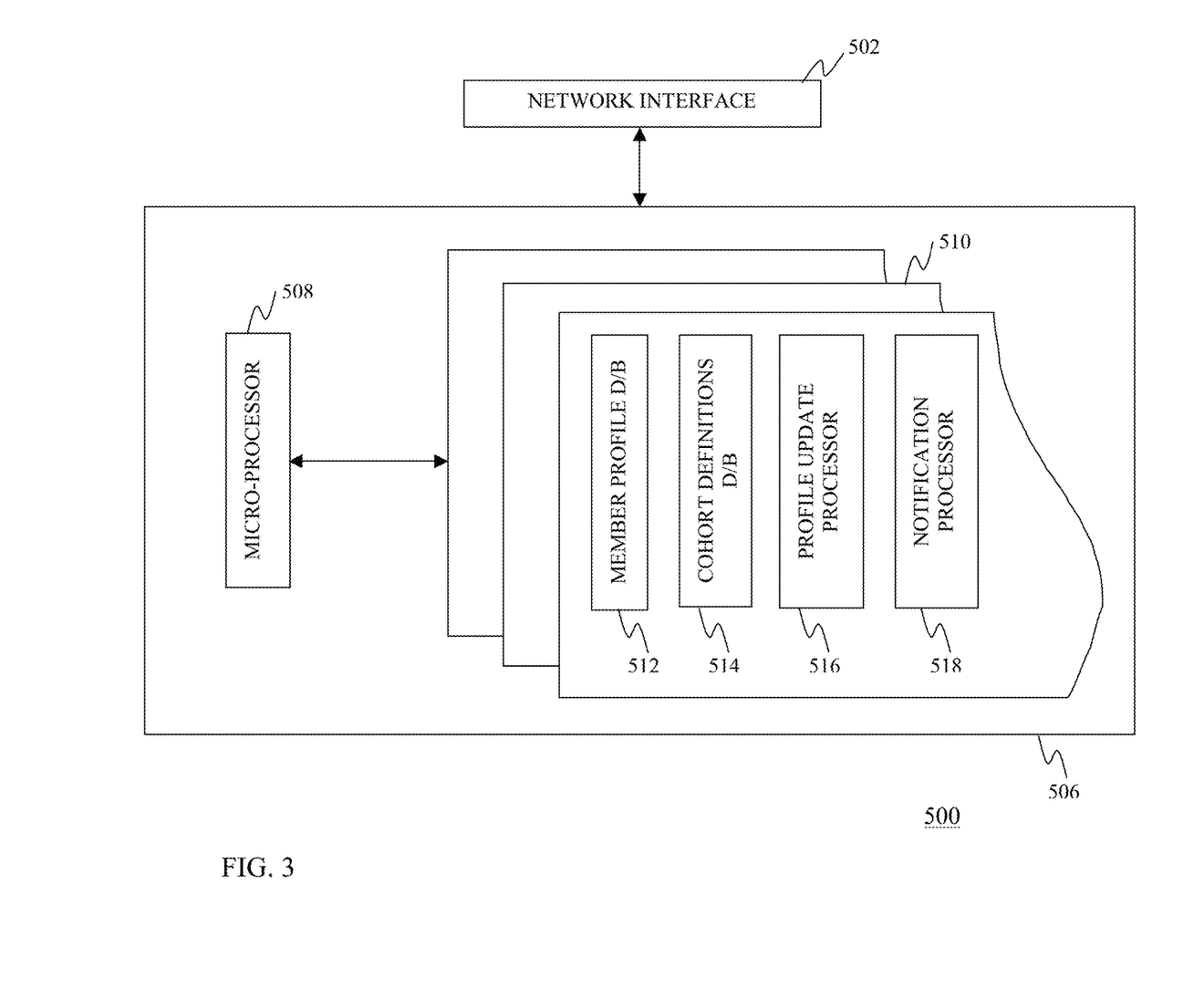
FIG. 3 is a schematic view of the event monitoring processor.

As shown in FIG. 3, the event monitoring processor 500 includes a network interface 502, and a data processing system 506 that is coupled to the network interface 502. The network interface 502 interfaces the event monitoring processor 500 with the wide area network 110 and allows the event monitoring processor 500 to communicate with the financial institution servers 400.

The data processing system 506 may include one or more microprocessors 508 and a non-transient computer-readable medium 510. The computer-readable medium 510 may be provided as electronic computer memory (e.g. flash memory) or optical or magnetic memory (e.g. compact disc, hard disk) and may maintain a member profile database 512 and a cohort definitions database 514.

The member profile database 512 includes groups of related database records each associated with a respective member of the event monitoring system 100. Each records group of the member profile database 512 defines a member profile for the associated member. Each member profile identifies an incentive account that the member wishes to use to implement an incentive transaction (defined in the cohort definitions database 514), and includes a member identifier that is uniquely associated with the respective member In one example, each member profile also includes the primary account number of a payment card issued (or authorized to be issued) to the associated member by one of the financial institutions.

The incentive account, as contemplated herein, is not limited to any particular form and may comprise, for example, a savings account, a chequing account, a credit account, a line of credit account and/or a loyalty points account. The incentive account identified in the member's profile may be maintained by the same financial institution that maintains the financial account associated with the member's payment card. However, the incentive account may be maintained by any financial institution of the event monitoring system 100.

Each member profile also includes member data that includes, but is not limited to, personal attributes of the member and financial characteristics of the member. The personal attributes include, but are not limited to, age range of the member, age range of the member's children, size of the member's family, the member's profession, current location of the member, and an event definition (e.g. location/time/day/date of a vacation or business trip that the member has attended or plans on attending, particulars of a shopping outing (e.g. a list (e.g. product codes, product classes) of one or more products (goods/wares or services) that the member intends on purchasing)) of an event. The financial characteristics include, but are not limited to, an annual monetary income range, net worth, debt level and credit score of the member and/or household, monetary spending patterns (e.g. time (hour/day of week/month) of a reoccurring purchase, location of a reoccurring purchase, and daily/weekly/monthly purchase amounts of the member and/or household.

Each member profile may also store a unique userID and associated passcode (which may be stored in encrypted form) which the member may use to access the member's profile and update the data stored in the member's profile, such as the member data, particulars of the member's incentive account, and the primary account number of the member's payment card.

The cohort definitions database 514 includes groups of related database records each associated with a respective cohort. Each records group of the cohort definitions database 514 saves one or more cohort definitions for the associated cohort. Each cohort definition defines requirements/parameters for the associated cohort, and a typical transaction that is typically initiated by members of the cohort.

The cohort requirements/parameters include, but are not limited to, the personal attributes of cohort members, the financial characteristics of cohort members, geographic data defining a location of a particular merchant, geographic data defining a common geographic region of a plurality of merchants (e.g. shopping mall/plaza, city, municipality, province/state), and geographic data defining a notification-free zone in which incentive notifications to cohort members are suppressed.

The cohort requirements/parameters also include financial transaction data that is typically associated with an activity or event. The financial transaction data includes product codes and classes of products (goods/wares or services) typically purchased, class(es) of product(s) (goods/wares or services) typically purchased, typical time/date of a purchase(s), typical price (e.g. mean, mode, standard deviation) of product(s) purchased, geographic data defining the location(s) at which the product (goods/wares or services) are typically purchased, and total transaction amount typically incurred at the activity or event.

The typical transactions defined in the cohort definitions may be determined by considering any of a multitude of transactions, including products that are typically purchased by members of the cohort, products that are typically purchased within or proximate a particular geographic location or region, and products that are typically purchased at a particular time/date or within a particular time frame.

Each cohort definition also includes an incentive transaction definition of an incentive transaction to be implemented when the requirements of the associated cohort definition are met. The incentive transaction may be a credit transaction and/or a debit transaction, and the cohort definition typically specifies a variable incentive amount to be credited to or debited from an incentive account during the incentive transaction. The event monitoring processor 500 may determine the incentive amount by comparing the financial transaction that is initiated by a member of one of the cohorts with a transaction that is typically performed by the cohort.

In addition to the member profile database 512 and the cohort definitions database 514, the non-transient computer-readable medium 510 may also include a merchant location database (not shown). The merchant location database may include groups of related database records each associated with a respective merchant. Each records group of the merchant location database may save a merchant profile for the associated merchant. In one example, each merchant profile identifies a merchant identifier merchID that is uniquely associated with the respective merchant, and geographic data identifying the physical location(s) of the merchant.

The non-transient computer-readable medium 510 may also include computer processing instructions stored thereon which, when executed by the microprocessor(s) 508, define an operating system (not shown) that controls the overall operation of the event monitoring processor 500. The computer processing instructions may also implement a profile update processor 516 and a notification processor 518.

The profile update processor 516 may receive location information associated with members of the event monitoring system 100, locate the member profiles associated with each of the respective members, and update the respective member profiles with the received location information.

As discussed, the mobile communications devices 300 may send location update messages that include a member identifier that is uniquely associated with the member (user of the respective mobile communications device 300), and position data that is associated with the current location (member location) of the respective mobile communications device 300. Accordingly, the profile update processor 516 may be configured to query the member profile database 512 with the member identifier included in the location update messages to locate the member profile associated with the respective members, and to update the member profiles with the respective member locations received from the mobile communications devices 300.

Alternately, a member may use a communications device other than a mobile communications device 300, such as a personal computer, to send location update messages that identify the current location (member location) of the member, and the profile update processor 516 may be configured to update the member's profile with the member location. For example, the member may authenticate to the event monitoring processor 500 by providing the member's userID and passcode to the profile update processor 516 via a web browser installed on the member's personal computer, and provide the profile update processor 516 with location information (e.g. city, province/state, country) of the member's current or default location. The profile update processor 516 may be configured to authenticate the member by querying the member profile database 512 with the received userID to locate the member profile associated with the member, and comparing the received passcode against the passcode saved in the member profile. If the member is successfully authenticated, the profile update processor 516 may update the member's profile with the location information received from the personal computer.

The notification processor 518 is configured to receive an action notification message identifying a member action (e.g. a financial transaction) that is initiated by a member of one of the cohorts.

The notification processor 518 is configured to determine, from the cohort definition of the one cohort, a correlation outcome value (e.g. incentive amount) from a correlation between the member action and an action that is associated with the one cohort (e.g. a typical transaction typically performed by that cohort), and to update at least one of the cohort definitions with particulars of the member action.

The notification processor 518 is configured to add to a cohort member database (e.g. incentive account) a member database record that identifies the correlation outcome value (e.g. funds deposit/withdrawal in the incentive amount). The cohort member database is associated with the cohort member.

In one example, the notification processor 518 is configured to determine the location of the cohort members from location information, and to determine the cohort(s) associated with each cohort member by correlating the member location with the cohort definitions in substantially real-time with receiving member location information.

As discussed, the cohort requirements/parameters specified in one or more of the cohort definitions may include geographic data defining a common geographic region of a plurality of merchants. The cohort requirements/parameters specified in one or more of the cohort definitions may include geographic data defining a geographic region of a single merchant. The notification processor 518 may be configured to determine the member's cohort(s) by correlating the member location with the geographic region.

The notification processor 518 may be configured to provide to cohort member with an incentive notification identifying a typical transaction that is typically performed by the member's cohort(s). The notification processor 518 may be configured to provide the incentive notification by determining the typical transaction, in substantially real-time with determining the member's cohort(s), from a product that is typically purchased proximate the member location. Typically, the notification processor 518 provides the incentive notification to the mobile communications device 300 (or the personal computer) in advance of the financial transaction.

The notification processor 518 may also be configured to provide the incentive notification by determining the typical transaction, in substantially real-time with determining the member's cohort(s), from a total purchase amount of the plurality of merchants within the common geographic region. The notification processor 518 may be configured to provide the incentive notification by determining the typical transaction, in substantially real-time with determining the member's cohort(s), from a total purchase amount from the single merchant within the geographic region.

The geographic data may define geographic regions of merchants having a common merchant category code. The notification processor 518 may be configured to determine the member's cohort(s) by correlating the member location with the geographic data, and may be configured to provide the incentive notification by determining the typical transaction from a total purchase amount with the merchants having the common merchant category code.

The geographic data may define at least one geographic location of a notification-free zone. The notification processor 518 may be configured to provide an incentive notification of the typical transaction by suppressing the incentive notification after determining that the member location correlates with at least one of these geographic locations.

As discussed, the cohort requirements/parameters specified in one or more of the cohort definitions in the cohort definitions database 514 may include one or more personal attributes (e.g. age range of member and/or member's children, size of member's family, member's profession, products a member might purchase) and/or financial characteristics (e.g. income range, net worth, debt level and/or credit score of member/household, spending patterns, location of a reoccurring purchase) of cohort members. One or more of the member profiles in the member profile database 512 may include corresponding personal attributes and/or financial characteristics of the member, and the notification processor 518 may be configured to determine the member's cohort(s) by correlating the cohort definitions with the personal attributes and/or the financial characteristics in the member profile.

The cohort requirements/parameters specified in one or more of the cohort definitions in the cohort definitions database 514 may include financial transaction data (e.g. product codes and/or class(es) of product(s) typically purchased, time/date of a purchase(s), typical price (e.g. mean, mode, standard deviation) of product(s) purchased, the location(s) of the product(s) purchased, and total transaction amount) of one or more typical transactions that are typically associated with an activity or event. The personal attributes defined in one or more of the member profiles in the member profile database 512 may include an event definition (e.g. location/time/day/date of a vacation or business trip that the member has attended or plans on attending, particulars of a shopping outing (e.g. a list (e.g. product codes, product classes) of one or more products (goods/wares or services) that the member intends on purchasing)) defining an event, and the notification processor 518 may be configured to determine the member's cohort(s) by correlating the event definition in the member profile with the activities or events specified in the cohort definitions.

In one example, the notification processor 518 is configured to update at least one of the cohort definitions with particulars of the member action (e.g. financial transaction), after receiving the action notification. The notification processor 518 may also update the at least one cohort definition with the member location. The notification processor 518 may be configured to determine a time instant of the member action from the action notification, and may update the at least one cohort definition with the time instant of the member action.

The notification processor 518 may receive from a third-party data source (not shown) financial attribute data that includes, for example, individual and/or household annual monetary incomes, net worth values, debt levels, credit scores and/or spending patterns, typical times/dates of purchase(s), and/or typical prices (e.g. mean, mode, standard deviation) of product(s) purchased, and may update at least one of the cohort definitions with the financial attribute data. The notification processor 518 may also receive from a third-party data source (not shown) non-financial attribute data that includes, for example, product codes and/or classes of products typically purchased, and/or geographic data defining the location(s) at which the products are typically purchased, and may update at least one of the cohort definitions with the non-financial attribute data.

The action notification may include a pointer (e.g. account information encoded on a payment card) to a primary database (e.g. a financial institution account uniquely associated with a payment card), and the member action may be a financial transaction. In this variation, the notification processor 518 is configured to effect a transfer of funds between the cohort member database (e.g. incentive account) and the primary database (e.g. a financial institution account uniquely associated with a payment card) in an amount of the correlation outcome value (e.g. incentive amount). The notification processor 518 may be configured to transfer the amount of the correlation outcome value into a holding account from one of the cohort member database and the primary database, and to transfer a total balance from the holding account into the other of the cohort member database and the primary database upon the total balance in the holding account exceeding a minimum threshold amount.

Although the notification processor 518 is typically implemented as computer processing instructions, all or a portion of the functionality of the notification processor 518 may be implemented instead in electronics hardware, such as a field programmable logic gate array (FPGA) or a complex programmable logic device (CPLD).

Method of Monitoring Cohort Activity

As discussed, the event monitoring system 100 implements a method of monitoring cohort activity. By way of overview of the method involves the event monitoring processor 500 maintaining a database of cohort definitions, each defining a respective cohort. The method involves the event monitoring processor 500 receiving an action notification identifying a member action (e.g. a financial transaction) that is initiated by a member of one of the cohorts.

The method involves the event monitoring processor 500 determining, from the cohort definition of the one cohort, a correlation outcome value (e.g. incentive amount) from a correlation between the member action and an action that is associated with the one cohort (e.g. a typical transaction typically performed by that cohort), and updating at least one of the cohort definitions with particulars of the member action.

The method also involves the event monitoring processor 500 adding to a cohort member database (e.g. incentive account) a member database record identifying the correlation outcome value (e.g. funds deposit/withdrawal in the incentive amount). The cohort member database is associated with the cohort member.

Figure 4:
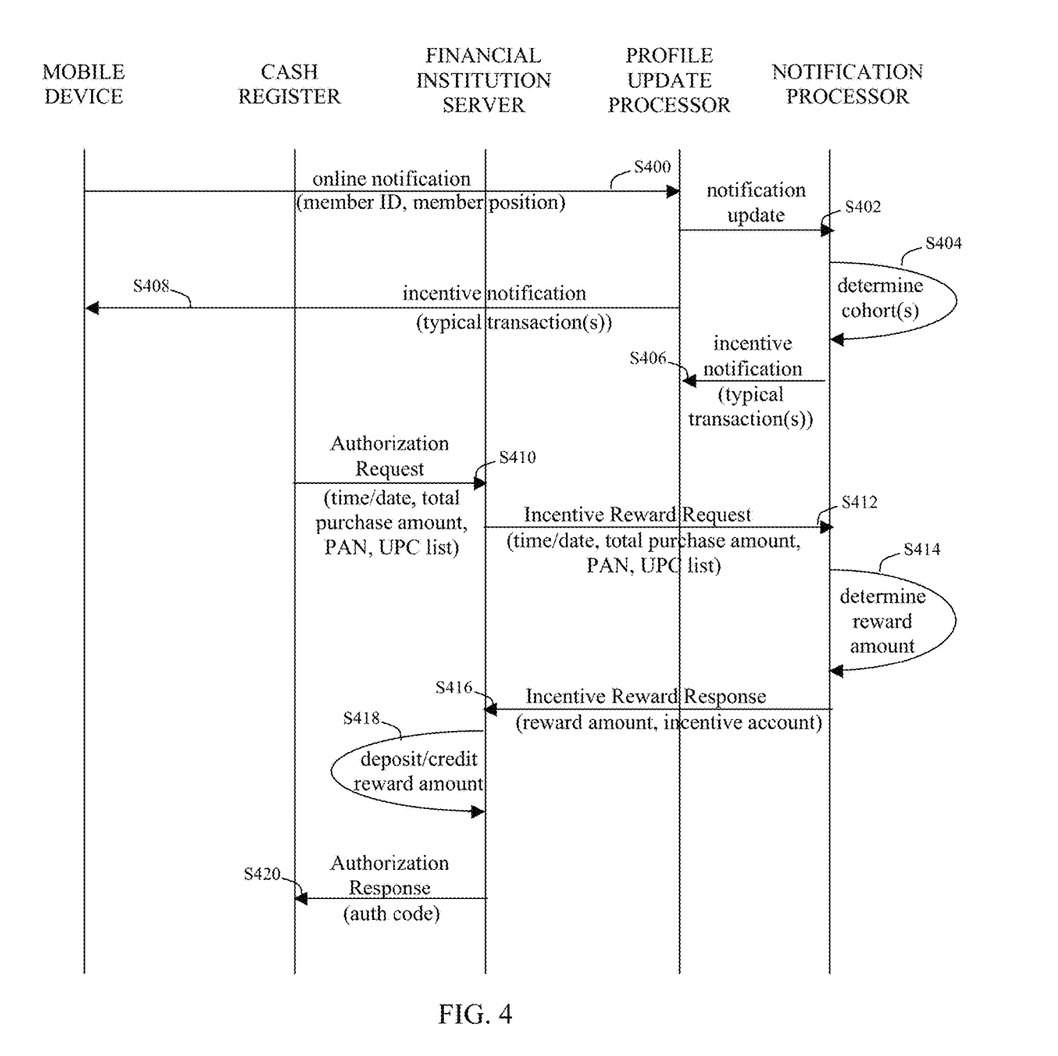
FIG. 4 is a message flow diagram depicting the method of monitoring cohort activity implemented by the event monitoring processor.

An example of the cohort activity monitoring method will now be discussed in detail with reference to FIG. 4. In the following example, each product (good/ware or service) being offered for sale by a merchant is associated with a universal product code (UPC), and the POS terminal 200 is configured as a semi-integrated POS comprising a "smart" pin-pad terminal in communication with an ECR. Although the following example describes the method in the context of a financial transaction initiated at a merchant, it should be understood that the method can be applied to other contexts, such as the monitoring of network resources and electronic device failures, where data obtained from monitoring of events can inform the scope of events to be monitored.

Periodically, the notification processor 518 may receive, from a data feed, financial attribute data that includes, for example, individual and/or household annual monetary incomes, net worth values, debt levels, credit scores and/or spending patterns, typical times/dates of purchase(s), and/or typical prices (e.g. mean, mode, standard deviation) of product(s) purchased, and may update the cohort definitions with the financial attribute data. Periodically, the notification processor 518 may also receive from a data feed, non-financial attribute data that includes, for example, product codes and/or classes of products typically purchased, and/or geographic data defining the location(s) at which the products are typically purchased, and may update the cohort definitions with the non-financial attribute data.

At step S400, a mobile communications device 300 (or a personal computer) in the possession of a member of the event monitoring system 100 (customer) may transmit to the event monitoring processor 500 an online notification message that confirms that the member is connected to the event monitoring system 100. The online notification message includes the member identifier of the member, and optionally also position data identifying the current location (member location) of the mobile communications device 300 (personal computer). If the mobile communications device 300 (or a personal computer) has previously transmitted an online notification message to the event monitoring processor 500, but determines that the member location has not changed since the previous notification update message (or the change in location is less than a threshold distance), the mobile communications device 300 (or a personal computer) may withhold sending the online notification message.

The profile update processor 516 of the event monitoring processor 500 may locate the member profile that is associated with the member by querying the member profile database 512 with the member identifier included in the notification confirmation message, and may save the member location (if received) in the located member profile. At step S402, the profile update processor 516 may then pass to the notification processor 518 a notification update message that includes the member identifier and confirms that the associated member wishes to receive incentive notifications.

After receiving the notification update message, the notification processor 518 locates the member profile that is associated with the member by querying the member profile database 512 with the member identifier included in the notification update message. The notification processor 518 may also maintain a record of the respective time instant at which the notification processor 518 last received a notification update message for each member, and may also query the member profile database 512 with the member identifier for that member if a period of time since the notification processor 518 last received a notification update message for a particular member exceeds a threshold amount. At step S404, the notification processor 518 correlates the located member profile with the cohort definitions and thereby determines the cohort(s) that is/are associated with the member. The notification processor 518 then saves in the member profile particulars of the cohort(s) that is/are associated with the member.

As discussed, each cohort definition in the cohort definitions database 514 defines requirements/parameters for the associated cohort. Therefore, the notification processor 518 determines the cohort(s) (if any) that is/are associated with the member by querying the cohort requirements/parameters of the cohort definitions with the member data included in the located member profile.

The cohort requirements/parameters may include one or more of the age range of the cohort member, age range of the cohort member's children, size of the cohort member's family, the cohort member's profession, and products a member might purchase. The notification processor 518 may determine the cohort(s) (if any) associated with the member by determining from the cohort definition(s) whether any of the personal attributes defined in the located member profile (eg. age range of the member, age range of the member's children, size of the member's family, the member's profession) matches any corresponding requirement/parameter of any of the cohort definitions.

The cohort requirements/parameters may identify an activity or event. The notification processor 518 may determine the cohort(s) (if any) associated with the member by determining from the cohort definition(s) whether any event definition defined in the located member profile (e.g. location/time/day/date of a vacation or business trip that the member has attended or plans on attending, particulars of a shopping outing (e.g. a list (e.g. product codes, product classes) of one or more products (goods/wares or services) that the member intends on purchasing)) corresponds with an activity or event defined in any of the cohort definitions.

The cohort requirements/parameters may include an annual monetary income range, net worth, debt level and/or credit score of a cohort member and/or household, monetary spending patterns (e.g. time (hour/day of week/month) of a reoccurring purchase, and daily/weekly/monthly purchase amounts of a cohort member and/or household. The notification processor 518 may determine the cohort(s) (if any) associated with the member by determining from the cohort definition(s) whether any of the financial characteristics defined in the located member (e.g. income range, net worth, debt level and/or credit score of the member or household, spending patterns and/or daily/weekly/monthly purchase amounts of the member and/or household) matches any corresponding requirement/parameter of any of the cohort definitions.

The cohort requirements/parameters may include geographic data defining a common geographic region of a plurality of merchants. The notification processor 518 may determine the cohort(s) (if any) associated with the member by determining from the cohort definition(s) whether the member location, as saved in the member profile, corresponds with any defined common geographic region.

The requirements/parameters of the cohort definitions may include geographic data defining a location of a particular merchant. The notification processor 518 may determine the cohort(s) (if any) associated with the member by determining from the cohort definition(s) whether the member location, as saved in the member profile, corresponds with the location of any defined merchant.

The requirements/parameters of the cohort definitions may include geographic data defining geographic regions of merchants having a common merchant category code. The notification processor 518 may determine the cohort(s) (if any) associated with the member by determining from the cohort definition(s) whether the member location, as saved in the member profile, corresponds with the location of any of said merchants.

The requirements/parameters of the cohort definitions may include the location of a reoccurring purchase. The notification processor 518 may determine the cohort(s) (if any) associated with the member by determining from the cohort definition(s) whether the member location, as saved in the member profile, corresponds with the location of any defined reoccurring purchase.

In each case where the online notification message (received at step S400) includes the member's location, the notification processor 518 may determine the cohort(s)

associated with the member by correlating the member location with the cohort definitions in substantially real-time with receiving the member location.

As discussed, each cohort definition also defines a typical transaction that is typically initiated by members of the cohort. Therefore, the notification processor 518 uses the cohort definition(s) of the cohort(s) (if any) that is/are associated with the cohort member to determine the transaction(s) that is/are typically performed by members of the cohort. In one example, the notification processor 518 determines the typical transaction, in substantially real-time with determining the cohort(s) (if any) that is/are associated with the cohort member.

Where one or more of the personal attributes defined in the located member profile correspond with an activity or event defined in any of the cohort definitions, the notification processor 518 may determine the typical transaction(s) by extracting one or more elements from the financial transaction data (eg. product codes and class(es) of product(s) typically purchased, typical time/date of a purchase(s), typical price (e.g. mean, mode, standard deviation) of product(s) purchased, and total transaction amount) defined in the cohort definition(s).

Where one or more of the financial characteristics defined in the located member profile correspond with the financial characteristics defined in any of the cohort definitions, the notification processor 518 may determine the typical transaction(s) by extracting one or more elements from the financial characteristics (eg. monetary spending patterns of a reoccurring purchase, and daily/weekly/monthly purchase amounts of a cohort member and/or household) defined of the cohort definition(s).

Where the member location defined in the located member profile corresponds with the common geographic region of a plurality of merchants, the notification processor 518 may determine the typical transaction(s) by extracting from the cohort definition(s) particulars of transactions (eg. average total purchase amount) that typically occur in or proximate the common geographic region.

Where the member location defined in the located member profile corresponds with the location of a particular merchant, the notification processor 518 may determine the typical transaction(s) by extracting from the cohort definition(s) particulars of transactions (eg. average price of product typically purchased, average total purchase amount) that typically occur at or proximate the merchant.

Where the member location defined in the located member profile corresponds with the geographic region of merchants having a common merchant category code, the notification processor 518 may determine the typical transaction(s) by extracting from the cohort definition(s) particulars of transactions (eg. average price of product typically purchased, average total purchase amount) that typically occur at any of said merchants.

Where the member location defined in the located member profile corresponds with the location of a reoccurring purchase, the notification processor 518 may determine the typical transaction(s) by extracting from the cohort definition(s) particulars of transactions (eg. average price of product) involving the reoccurring purchase.

In each case where the online notification message (received at step S400) includes the member's location, the notification processor 518 may determine the typical transaction in substantially real-time with determining the cohort(s) (if any) that is/are associated with the cohort member.

At step S406, the notification processor 518 generates an incentive notification message that identifies the typical transaction(s) typically incurred by the cohort(s) associated with the cohort member, and forwards the incentive notification message to the profile update processor 516. At step S408, the profile update processor 516 transmits the incentive notification message to the member's mobile communications device 300 (or personal computer), in response to the online notification message, via the communications channel over which the event monitoring processor 500 received the online notification message. The profile update processor 516 may also save the incentive notification message in the member profile for the cohort member.

Alternately, where the member location defined in the located member profile corresponds with a notification-free zone (defined in any of the cohort definitions) in which incentive notifications to cohort members are to be suppressed, the notification processor 518 may suppress the incentive notification by not transmitting the incentive notification message to the cohort member (and not saving the incentive notification message in the member profile).

When the cohort member wishes to complete a financial transaction with a merchant, the cohort member attends at a POS terminal 200 of the merchant to initiate payment for the financial transaction. Based on the incentive notification, the cohort member may arrange the financial transaction so as to receive an award amount after completion of the financial transaction. Accordingly, typically the notification processor 518 transmits the incentive notification message to the cohort member in advance of the cohort member initiating the financial transaction.

As discussed above, the incentive notification message may specify the typical price (e.g. mean, mode, standard deviation) of a product typically purchased by the cohort(s). Therefore, in order to receive an award amount after completion of the financial transaction, the cohort member may choose to purchase a product having a lower price than the specified price of the product. The incentive notification message may specify the average total purchase amount spent by the cohort(s), and the cohort member may choose to spend less than the specified average total purchase amount. The incentive notification message may specify the typical class(es) of product(s) purchased by the cohort(s), and the cohort member may choose to purchase (or to not purchase) a product from one of the specified classes.

The incentive notification message may specify a spending pattern of a reoccurring purchase of the cohort(s), and the cohort member may choose to purchase a product that is consistent (or inconsistent) with the specified spending pattern. The incentive notification message may specify daily/weekly/monthly amounts spent by the cohort(s), and the cohort member may spend less than the specified daily/weekly/monthly spend amounts.

After attending at the POS terminal 200 of the merchant to initiate payment for the financial transaction, the merchant uses the ECR to read/input the UPC of each product of the financial transaction. The ECR may query the merchant price database with the UPC to determine the current price of each associated product. After all the products being purchased in the financial transaction have been read/input by the ECR, the ECR calculates the sum of the purchase price of all the products being purchased in the financial transaction (total purchase amount), and generates a message that includes the total purchase amount and a list of all the UPCs (and associated purchase price) of each product ("UPC list") being purchased in the financial transaction. The ECR then transmits the message to the pin-pad terminal.

After the customer uses the pin-pad terminal to approve payment for the total purchase amount and interfaces a payment card with the pin-pad terminal, the pin-pad terminal generates an Authorization Request message that specifies the time/date of the financial transaction, the total purchase amount, and the primary account number (read from the payment card), and includes the UPC list of the products that are being purchased in the financial transaction. The Authorization Request message may also include the merchID that is uniquely associated with the merchant.

At step S410, the POS terminal 200 transmits the Authorization Request message to the acquirer server 270 via the acquirer network 106. The acquirer server 270 directs the Authorization Request message to one of the financial institution servers 400, via the payment network 108, for validation. Typically the payment network 108 uses the primary account number of the Authorization Request Message to direct the Authorization Request message to the financial institution server 400 that maintains the financial account associated with the primary account number.

The financial institution server 400 determines whether the financial transaction can be authorized by determining whether the financial account that is associated with the primary account number is still active and has sufficient credit/funds to complete the transaction. If the financial transaction cannot be authorized, at step S420 the financial institution server 400 generates an authorization response code that indicates that the financial institution declined the financial transaction, generates an Authorization Response message that includes the authorization response code, and directs the Authorization Response message to the acquirer server 270 via the payment network 108. The acquirer server 270 forwards the Authorization Response Message to the POS terminal 200, via the acquirer network 106.

Conversely, if the financial transaction is authorized, the financial institution server 400 generates an Incentive Reward Request message that specifies the time/date of the financial transaction, the total purchase amount, the primary account number, and includes the UPC list of the financial transaction initiated by the cohort member. If the Authorization Request message includes the merchID, the financial institution server 400 may also incorporate the merchID into the Incentive Reward Request message. At step S412, the financial institution server 400 forwards the Incentive Reward Request message to the event monitoring processor 500.

After receiving the Incentive Reward Request message, the notification processor 518 queries the member profile database 512 with the primary account number (included in the Incentive Reward Request message) to determine whether the financial transaction was initiated by a cohort member. If the notification processor 518 determines that the financial transaction was initiated by a cohort member, the notification processor 518 accesses the member profile that is associated with the member.

To allow the cohort definitions to closely match the financial transactions initiated by the cohort members, the notification processor 518 may update one or more of the cohort definitions with particulars of the financial transaction. For example, the notification processor 518 may use the member location to update the cohort definition of each cohort associated with the member. If the member's profile includes the member's current location, the notification processor 518 may determine the member location from the member's profile, and may then use the member location to update one or more of the cohort definitions. If the Authorization Request message includes the merchID of the merchant, the notification processor 518 may determine the member location by querying the merchant location database with the merchID, and may then use the member location to update one or more of the cohort definitions. This cohort adjusting step may involve more narrowly defining the geographic region(s) associated with a cohort, or generating additional cohort definitions each defining additional respective geographic regions.

The cohort definitions may also include financial transaction data (e.g. produce codes and classes of product(s) typically purchased, time/date of the transaction, price of product(s) purchased, total transaction amount) of one or more typical transactions that are typically associated with an activity or event. Therefore, independently of whether the financial transaction was initiated by a cohort member, the notification processor 518 may use the Incentive Reward Request message to update one or more of the cohort definitions in the cohort definitions database 514 with, for example, the class(es) and prices of the product(s) purchased (as determined from the UPC list), the time/date of the transaction, and/or the total transaction amount. This cohort updating step may involve more narrowly defining the class, time/date and/or price of the typical financial transaction and/or the event associated with a cohort, and/or generating additional cohort definitions each defining additional respective typical transactions and/or events.

Further, as discussed, periodically the notification processor 518 may receive, from a data feed (not shown), financial attribute data that includes monetary incomes and spending patterns, and may update the cohort definitions with the financial attribute data. Periodically, the notification processor 518 may also receive non-financial attribute data from a data feed, and may update the cohort definitions with the non-financial attribute data.

After the notification processor 518 accesses the member profile that is associated with the member, and optionally updates the cohort definitions, the notification processor 518 extracts from the member profile particulars of the member's incentive account, particulars of the cohort(s) associated with the cohort member, and the incentive notification message (if any) that was transmitted to the cohort member. The notification processor 518 also locates the incentive transaction definition for the associated cohort(s) by querying the cohort definitions database 514 with the cohort particulars extracted from the located member profile.

At step S414, the notification processor 518 determines an incentive amount for the financial transaction by applying the particulars of the typical transaction (included in the incentive notification message) and the particulars (list of the UPCs and associated purchase price) of the financial transaction (included in the Incentive Reward Request message) as inputs to the located incentive transaction definition. As discussed, typically the notification processor 518 determines the incentive amount by comparing the financial transaction initiated by the cohort member with the typical transaction for cohort.

The incentive transaction definition may specify that the incentive amount is the amount by which the average price of the product in the typical transaction exceeds the purchase price of the product in the financial transaction. Therefore, the notification processor 518 may determine the incentive amount by calculating the difference between the average price specified in the incentive notification message and the purchase price of the product purchased in the financial transaction.

The incentive transaction definition may specify that the incentive amount is the amount by which the average total price spent by the cohort in the typical transaction exceeds the total purchase amount in the financial transaction. Therefore, the notification processor 518 may determine the incentive amount by calculating the difference between the average total purchase amount, as specified in the incentive notification message, and the total purchase amount in the financial transaction.

The incentive transaction definition may specify that the incentive amount is the amount by which the average price of products in the typical class in the typical transaction exceeds the purchase price of products in the typical class in the financial transaction. Therefore, the notification processor 518 may determine the incentive amount by calculating the difference between the average price of products in the typical class, as specified in the incentive notification message, and the purchase price of the product in the typical class, as purchased in the financial transaction.

The incentive transaction definition may specify that the incentive amount is the amount by which the daily/weekly/monthly amount spent by the cohort in the typical transaction exceeds the daily/weekly/monthly amount spent in the financial transaction. Therefore, the notification processor 518 may update the member profile with a running total of the daily/weekly/monthly amount spent by the cohort member, and may determine the incentive amount by calculating the difference between the daily/weekly/monthly spend amount, as specified in the incentive notification message, and the running total daily/weekly/monthly spend amount.

After determining the incentive amount (if any) for the financial transaction, the notification processor 518 determines from the incentive transaction definition whether the incentive transaction requires the incentive amount to be credited to or debited from the incentive account. The notification processor 518 also generates an Incentive Reward Response message that specifies the incentive amount and the incentive account for the incentive transaction, and indicates whether the incentive amount should be credited to or debited from the incentive account. At step S416, the notification processor 518 may initiate a transfer of the incentive amount into the specified incentive account by forwarding the Incentive Reward Response message to the financial institution server 400.

Alternately, the incentive transaction definition may specify that the incentive amount should not be applied to the incentive account until the total incentive amounts exceed a minimum threshold amount. Accordingly, the notification processor 518 may save on the event monitoring processor 500, in a holding account associated with the incentive account, a running total of all the incentive amounts to be applied to the incentive account. When the running total in the holding account associated with the incentive account exceeds the minimum threshold amount specified in the incentive transaction definition, the notification processor 518 generates an Incentive Reward Response message that specifies the running total incentive amount and the incentive account for the incentive transaction, and indicates whether the incentive amount should be credited to or debited from the incentive account. At step S416, the notification processor 518 may initiate a transfer of the running total incentive amount into the specified incentive account by forwarding the Incentive Reward Response message to the financial institution server 400.

If the Incentive Reward Response message indicates that the incentive amount should be credited to the incentive account, the financial institution server 400 determines whether the financial account that is associated with the primary account number specified in the Incentive Reward Request message is still active and has sufficient funds for a debit in the incentive amount. If the financial institution server 400 determines that the incentive transaction cannot be completed, the financial institution server 400 may notify the event monitoring processor 500 that the incentive transaction failed. The notification processor 518 may then re-forward the Incentive Reward Response message to the financial institution server 400 after a predetermined period of time. Otherwise, if the financial institution server 400 determines that the incentive transaction can be completed, at step S418 the financial institution server 400 credits the incentive amount to the incentive account and applies a corresponding debit to the financial account that is associated with the primary account number specified in the Incentive Reward Request message.

Conversely, if the Incentive Reward Response message indicates that the incentive amount should be debited from the incentive account, the financial institution server 400 determines whether the incentive account is still active and has sufficient funds for a debit in the incentive amount. If the financial institution server 400 determines that the incentive transaction cannot be completed, the financial institution server 400 may notify the event monitoring processor 500 that the incentive transaction failed. The notification processor 518 may then re-forward the Incentive Reward Response message to the financial institution server 400 after a predetermined period of time. Otherwise, if the financial institution server 400 determines that the incentive transaction can be completed, at step S418 the financial institution server 400 debits the incentive amount from the incentive account and applies a corresponding credit to the financial account that is associated with the primary account number specified in the Incentive Reward Request message.

The financial institution server 400 may also notify the notification processor 518 whether the incentive transaction failed or completed. In response, the notification processor 518 may generate an incentive alert message that identifies the incentive amount and indicates whether the incentive transaction failed or completed, and may transmit the incentive alert message to the mobile communications device 300 (or a personal computer) via the communications channel over which the event monitoring processor 500 received the online notification message (step S400).

Independently of the incentive transaction failing or completing, at step S420, the financial institution server 400 generates an authorization response code that indicates that the financial institution authorized the financial transaction at step S412, generates an Authorization Response message that includes the authorization response code, and directs the Authorization Response message to the acquirer server 270 via the payment network 108. The acquirer server 270 forwards the Authorization Response Message to the POS terminal 200, via the acquirer network 106.

In one variation, the financial institution server 400 may incorporate into the Authorization Response message the incentive alert message and, optionally the current balance of funds in the incentive account, to thereby allow the POS terminal 200 to notify the customer of the incentive account activity.

The invention claimed is:

1. An event monitoring processor comprising:
   at least one memory storing a database of cohort definitions, each said cohort definition defining a respective cohort; and
   a notification processor coupled to the memory and configured to:
      receive particulars of a member event initiated by a member of one of the cohorts;

generate an additional cohort definition from the particulars of the member event, and save the additional cohort definition in the cohort definitions database;
receive member data associated with the cohort member, and select one of the cohorts in the cohort definitions database from a correlation between the member data and the cohort definitions; and
save in a cohort member database a member record identifying a correlation between the member event and an event defined in the selected one cohort.

2. The event monitoring processor according to claim 1, wherein the notification processor is configured to generate the additional cohort definition after receiving the particulars of the member event.

3. The event monitoring processor according to claim 2, wherein the particulars of the member event include member location, and the notification processor is configured to generate the additional cohort definition by determining at least one additional geographic region from the member location and incorporating the at least one additional geographic region into the additional cohort definition.

4. The event monitoring processor according to claim 2, wherein the particulars of the member event include particulars of an item purchased by the cohort member, and the notification processor is configured to generate the additional cohort definition by determining a product class from the item particulars and incorporating the product class into the additional cohort definition.

5. The event monitoring processor according to claim 2, wherein the particulars of the member event include particulars of an item purchased by the cohort member, and the notification processor is configured to generate the additional cohort definition by determining a typical purchase price from the item particulars and incorporating the typical purchase price into the additional cohort definition.

6. The event monitoring processor according to claim 1, wherein the particulars of the member event includes a pointer to a primary database, the member event comprises a financial transaction, and the notification processor is configured to effect a transfer of funds between the cohort member database and the primary database in an amount of the correlation.

7. The event monitoring processor according to claim 6, wherein the notification processor is configured to transfer the amount of the correlation into a holding account from one of the cohort member database and the primary database, and to transfer a total balance from the holding account into another of the cohort member database and the primary database upon the total balance in the holding account exceeding a minimum threshold amount.

8. A method of monitoring cohort activity, the method being executable on a computer including at least one memory, the at least one memory storing a database of cohort definitions, each said cohort definition defining a respective cohort, the method comprising:
the computer receiving particulars of a member event initiated by a member of one of the cohorts;
the computer generating an additional cohort definition from the particulars of the member event, and saving the additional cohort definition in the cohort definitions database;
the computer receiving member data associated with the cohort member;
the computer selecting one of the cohorts in the cohort definitions database from a correlation between the member data and the cohort definitions; and
the computer saving in a cohort member database a member record identifying a correlation between the member event and an event defined in the selected one cohort.

9. The method according to claim 8, wherein the generating comprises the computer providing the additional cohort definition after receiving the particulars of the member event.

10. The method according to claim 9, wherein the particulars of the member event include member location, and the generating comprises the computer determining at least one additional geographic region from the member location and incorporating the at least one additional geographic region into the additional cohort definition.

11. The method according to claim 9, wherein the particulars of the member event include particulars of an item purchased by the cohort member, and the generating comprises the computer determining a product class from the item particulars and incorporating the product class into the additional cohort definition.

12. The method according to claim 9, wherein the particulars of the member event include particulars of an item purchased by the cohort member, and the generating comprises the computer determining a typical purchase price from the item particulars and incorporating the typical purchase price into the additional cohort definition.

13. The method according to claim 8, wherein the particulars of the member event includes a pointer to a primary database, the member event comprises a financial transaction, and the saving a member record comprises the computer effecting a transfer of funds between the cohort member database and the primary database in an amount of the correlation.

14. The method according to claim 13, wherein the effecting a transfer comprises the computer transferring the amount of the correlation into a holding account from one of the cohort member database and the primary database, and transferring a total balance from the holding account into another of the cohort member database and the primary database upon the total balance in the holding account exceeding a minimum threshold amount.

15. A non-transient computer readable medium storing computer processing instructions which, when executed by a computer, cause the computer to:
store a database of cohort definitions in a memory of the computer, each said cohort definition defining a respective cohort;
receive particulars of a member event initiated by a member of one of the cohorts;
generate an additional cohort definition from the particulars of the member event, and save the additional cohort definition in the cohort definitions database;
receive member data associated with the cohort member, and select one of the cohorts in the cohort definitions database from a correlation between the member data and the cohort definitions; and
save in a cohort member database a member record identifying a correlation between the member event and an event defined in the selected one cohort.

16. The computer readable medium according to claim 15, wherein the processing instructions cause the computer to generate the additional cohort definition after receiving the particulars of the member event.

17. The computer readable medium according to claim 16, wherein the particulars of the member event include member location, and the processing instructions cause the computer to generate the additional cohort definition by determining at least one additional geographic region from the member location and incorporating the at least one additional geographic region into the additional cohort definition.

18. The computer readable medium according to claim 16, wherein the particulars of the member event include particulars of an item purchased by the cohort member, and the processing instructions cause the computer to generate the additional cohort definition by determining at least one of a product class and a typical purchase price from the item particulars and incorporating the at least one of the product class and the typical purchase price into the additional cohort definition.

19. The computer readable medium according to claim 15, wherein the particulars of the member event includes a pointer to a primary database, the member event comprises a financial transaction, and the processing instructions cause the computer to effect a transfer of funds between the cohort member database and the primary database in an amount of the correlation.

20. The computer readable medium according to claim 19, wherein the processing instructions cause the computer to transfer the amount of the correlation into a holding account from one of the cohort member database and the primary database, and to transfer a total balance from the holding account into another of the cohort member database and the primary database upon the total balance in the holding account exceeding a minimum threshold amount.

* * * * *